United States Patent
Lin

(10) Patent No.: US 12,024,630 B2
(45) Date of Patent: Jul. 2, 2024

(54) DIPPING COMPOSITE MATERIAL FOR ENHANCING CUT RESISTANCE OF CHEMICAL-RESISTANT GLOVES

(71) Applicant: Honghan Nantong Protection of Science & Technology Co.,Ltd., Jiangsu (CN)

(72) Inventor: Xin Lin, Jiangsu (CN)

(73) Assignee: Honghan Nantong Protection of Science & Technology Co., Ltd., Jiangsu (CN)

( * ) Notice: Subject to any disclaimer, the term of this patent is extended or adjusted under 35 U.S.C. 154(b) by 1002 days.

(21) Appl. No.: 16/962,833

(22) PCT Filed: Mar. 31, 2020

(86) PCT No.: PCT/CN2020/082401
§ 371 (c)(1),
(2) Date: Jul. 16, 2020

(87) PCT Pub. No.: WO2020/220909
PCT Pub. Date: Nov. 5, 2020

(65) Prior Publication Data
US 2021/0378334 A1    Dec. 9, 2021

(30) Foreign Application Priority Data

Apr. 30, 2019  (CN) .......................... 201910362441.9

(51) Int. Cl.
| | |
|---|---|
| C08L 7/02 | (2006.01) |
| A41D 19/015 | (2006.01) |
| A41D 31/24 | (2019.01) |
| C08K 3/22 | (2006.01) |
| C08K 3/36 | (2006.01) |
| C08K 7/14 | (2006.01) |
| C08L 9/08 | (2006.01) |
| C08L 19/02 | (2006.01) |
| C08L 77/00 | (2006.01) |

(52) U.S. Cl.
CPC .......... *C08L 7/02* (2013.01); *A41D 19/01505* (2013.01); *A41D 31/245* (2019.02); *C08K 3/22* (2013.01); *C08K 3/36* (2013.01); *C08K 7/14* (2013.01); *C08L 9/08* (2013.01); *C08L 19/02* (2013.01); *C08L 77/00* (2013.01); *C08K 2003/2206* (2013.01); *C08K 2003/222* (2013.01); *C08K 2003/2241* (2013.01); *C08K 2003/2244* (2013.01); *C08K 2003/2265* (2013.01); *C08L 2205/16* (2013.01); *D10B 2501/041* (2013.01)

(58) Field of Classification Search
CPC .. A41D 19/01505; A41D 31/245; C08K 3/22; C08K 3/36; C08K 7/14; C08K 7/10; C08K 2003/2206; C08K 2003/222; C08K 2003/2241; C08K 2003/2244; C08K 2003/2265; C08L 7/02; C08L 9/02; C08L 9/08; C08L 19/02; C08L 77/00; C08L 2205/16; D10B 2501/041
See application file for complete search history.

(56) References Cited

FOREIGN PATENT DOCUMENTS

| CN | 104845465 A | * | 8/2015 | |
|---|---|---|---|---|
| CN | 105860425 A | * | 8/2016 | |
| CN | 106883492 A | * | 6/2017 | |
| CN | 107354566 A | * | 11/2017 | ............... D04B 1/14 |
| CN | 109535678 A | * | 3/2019 | |
| JP | 3149893 U | * | 4/2009 | ......... A41D 19/0062 |
| WO | WO-2016133193 A1 | * | 8/2016 | ............. B29C 41/14 |

* cited by examiner

*Primary Examiner* — Anthony J Green
(74) *Attorney, Agent, or Firm* — JCIP GLOBAL INC.

(57) ABSTRACT

Disclosed is a dipping composite material for enhancing the cut resistance of chemical-resistant gloves, wherein an additive is added to a latex, and the additive is a metal oxide and/or silica and/or glass fiber and/or basalt fiber and/or aramid fiber. The present invention improves the formula of a dipping layer such that the dipping layer has the cut resistance, which can significantly improve the cut resistant level of gloves.

5 Claims, No Drawings

DIPPING COMPOSITE MATERIAL FOR ENHANCING CUT RESISTANCE OF CHEMICAL-RESISTANT GLOVES

CROSS-REFERENCE TO RELATED APPLICATION

This application is a 371 of international application of PCT application serial no. PCT/CN2020/082401, filed on Mar. 31, 2020, which claims the priority benefit of China application no. 201910362441.9, filed on Apr. 30, 2019. The entirety of each of the above mentioned patent applications is hereby incorporated by reference herein and made a part of this specification.

FIELD OF THE INVENTION

The present invention relates to a dipping layer of chemical-resistant gloves, and more particular to a dipping composite material for enhancing the cut resistance of gloves.

BACKGROUND OF THE INVENTION

A dipping layer commonly used in dipped gloves is neoprene, nitrile, etc. The role of the dipping layer is mainly to enhance the chemical resistance, grip strength and wear resistance of the gloves. The cut resistance of the gloves can only be improved by a glove core, and none of the existing dipping layers are able to enhance the cut resistance. Therefore, there is a need for a new technical solution to solve the above-mentioned technical problems.

SUMMARY OF THE INVENTION

The object of the present invention is to provide a dipping composite material for enhancing the cut resistance of chemical-resistant gloves, and a dipping layer made from the dipping composite material can significantly enhance the cut resistant level of the gloves.

The present invention adopts the following technical solutions:

A dipping composite material for enhancing the cut resistance of chemical-resistant gloves, wherein an additive is added to a latex, and the additive is a metal oxide and/or silica and/or glass fiber and/or basalt fiber and/or aramid fiber.

The latex is one of natural rubber, nitrile rubber, neoprene, silicone, styrene-butadiene rubber, polyurea, polyisoprene rubber, and acrylics, or a mixture thereof in any ratio.

The metal oxide is one of titanium dioxide, iron oxide, calcium oxide, magnesium oxide, sodium oxide, potassium oxide, phosphorus oxide, manganese oxide, and zirconium oxide, or a mixture thereof in any ratio.

The metal oxide is in a form of whisker, liquid or powder.

The glass fiber, basalt fiber and aramid fiber are all staple fiber or pulp.

The mass ratio of the additive to the latex is 1-6:10.

The present invention improves the formula of a dipping layer such that the dipping layer has the cut resistance, which can significantly improve the cut resistant level of gloves.

DETAILED DESCRIPTION OF THE INVENTION

Example 1

A dipping composite material for enhancing the cut resistance of chemical-resistant gloves, wherein a dipping composite was prepared by adding 0.5 Kg of titanium dioxide fine powder and 0.5 Kg of silica fine powder to 10 Kg of a neoprene rubber compound and stirring uniformly. An ordinary glove core without cut resistance was used. A glove was produced by dipping according to the existing dipping process.

Example 2

A dipping composite was prepared by adding 1 Kg of silica fine powder to 10 Kg of a neoprene rubber compound and stirring uniformly. A glove core and a dipping process were the same as in Example 1.

Example 3

A dipping composite was prepared by adding 1 Kg of silica fine powder and 1 Kg of glass staple fiber to 10 Kg of a neoprene rubber compound and stirring uniformly. A glove core and a dipping process were the same as in Example 1.

Example 4

A dipping composite was prepared by adding 1 Kg of silica fine powder and 1 Kg of glass staple fiber to 10 Kg of a neoprene rubber compound and stirring uniformly. A glove core and a dipping process were the same as in Example 1.

Example 5

A dipping composite was prepared by adding 1 Kg of titanium dioxide fine powder, 1 Kg of silica fine powder and 1 Kg of glass staple fiber to 10 Kg of a neoprene rubber compound and stirring uniformly. A glove core and a dipping process were the same as in Example 1.

Example 6

A dipping composite was prepared by adding 1 Kg of basalt fiber staple fiber and 1 Kg of glass staple fiber to 10 Kg of a nitrile compound and stirring uniformly. A glove core and a dipping process were the same as in Example 1.

Example 7

A dipping composite was prepared by adding 2 Kg of glass staple fiber to 10 Kg of a nitrile compound and stirring uniformly. A glove core and a dipping process were the same as in Example 1.

Example 8

A dipping composite was prepared by adding 1 Kg of magnesium oxide, 1 Kg of calcium oxide, and 1 Kg of aramid fiber pulp to 10 Kg of a nitrile compound and stirring uniformly. A glove core and a dipping process were the same as in Example 1.

Example 9

A dipping composite was prepared by adding 1 Kg of silica and 1 Kg of calcium oxide to 10 Kg of a polyurea material and stirring uniformly. A glove core and a dipping process were the same as in Example 1.

Example 10

A dipping composite was prepared by adding 1 Kg of silica and 1 Kg of basalt taple fiber to 10 Kg of a polyurea material and stirring uniformly. A glove core and a dipping process were the same as in Example 1.

Comparative Example 1

A dipping composite was only composed of a neoprene rubber compound, a glove core was identical to that in Example 1, and a glove was produced by the same dipping process.

Comparative Example 2

A dipping composite was only composed of a nitrile compound, a glove core was identical to that in Example 1, and a glove was produced by the same dipping process.

Comparative Example 3

A dipping composite was only composed of a polyurea compound, a glove core was identical to that in Example 1, and a glove was produced by the same dipping process.

The dipping layers of the gloves prepared in Examples 1-10 and Comparative Examples 1-3 described above had the same thickness. The cut resistant level and fire resistance of the gloves in the above 13 groups were tested, and the resulting data are as follows:

| Serial no. | Thickness of dipping layer | Glove core specifications | Cut resistance (ASTM) |
|---|---|---|---|
| Example 1 | 0.3 mm | 15-pin nylon glove core | A1 |
| Example 2 | 0.3 mm | 15-pin nylon glove core | A1 |
| Example 3 | 0.5 mm | 15-pin nylon glove core | A2 |
| Example 4 | 0.5 mm | 15-pin nylon glove core | A2 |
| Example 5 | 0.6 mm | 15-pin nylon glove core | A3 |
| Example 6 | 0.6 mm | 15-pin nylon glove core | A4 |
| Example 7 | 0.3 mm | 15-pin nylon glove core | A2 |
| Example 8 | 0.6 mm | 15-pin nylon glove core | A2 |
| Example 9 | 0.6 mm | 15-pin nylon glove core | A2 |
| Example 10 | 0.5 mm | 15-pin nylon glove core | A2 |
| Comparative example 1 | 0.3 mm | 15-pin nylon glove core | A0 |
| Comparative example 2 | 0.3 mm | 15-pin nylon glove core | A0 |
| Comparative example 3 | 0.3 mm | 15-pin nylon glove core | A0 |

What is claimed is:

1. A dipping composite material for enhancing the cut resistance of chemical-resistant gloves,
    wherein an additive is added to a latex, and the dipping composite material is made of the additive and the latex,
    the additive is composed of titanium dioxide, silica, and glass fiber, and
    the mass ratio of titanium dioxide, silica, and glass fiber is 1:1:1,
    wherein the latex is nitrile rubber, neoprene or polyurea.

2. The dipping composite material for enhancing the cut resistance of chemical-resistant gloves according to claim 1, wherein the titanium dioxide is in a form of whisker or powder.

3. The dipping composite material for enhancing the cut resistance of gloves according to claim 1, wherein the glass fiber is staple fiber or pulp.

4. The dipping composite material for enhancing the cut resistance of chemical-resistant gloves according to claim 1, wherein the mass ratio of the additive to the latex is 1-6:10.

5. A dipping composite material for enhancing the cut resistance of chemical-resistant gloves,
    wherein an additive is added to a latex, and the dipping composite material is made of the additive and the latex,
    the additive is composed of basalt fiber and glass fiber, and
    the mass ratio of basalt fiber and glass fiber is 1:1,
    wherein the latex is nitrile rubber, neoprene or polyurea.

* * * * *